United States Patent

[11] 3,590,745

| [72] | Inventors | Ralph C. Ouska<br>Hinsdale;<br>Frederick L. Smith, Maywood, both of, Ill. |
|---|---|---|
| [21] | Appl. No. | 813,813 |
| [22] | Filed | Apr. 2, 1969 |
| [45] | Patented | July 6, 1971 |
| [73] | Assignee | FMC Corporation<br>San Jose, Calif. |

[54] CAR-TYPE CONVEYOR CHAIN
12 Claims, 12 Drawing Figs.

[52] U.S. Cl. ................................................ 104/172
[51] Int. Cl. .................................................. B61b 3/00
[50] Field of Search .................................... 104/63, 66, 172, 172 C, 172 B; 198/155, 181, 189; 267/2, 6, 52; 295/36; 280/79.1, 87.01

[56] References Cited
UNITED STATES PATENTS

| 1,715,790 | 6/1929 | Schildman | 280/150 |
|---|---|---|---|
| 1,792,533 | 2/1931 | Francis | 104/25 |
| 2,153,098 | 4/1939 | Pellar | 198/189 |
| 2,162,419 | 6/1939 | Bryan | 198/181 |
| 3,435,780 | 4/1969 | Czarnecki et al. | 104/172 |

Primary Examiner—James B. Marbert
Attorneys—F. W. Anderson and C. E. Tripp

ABSTRACT: A series of roller-supported cars are propelled by a conveyor chain along a track that follows horizontal and vertical curves. The track includes a pair of vertical support rails and a pair of horizontal guides. Each link of the conveyor chain is joined at one end to an adjacent link for pivotal movement in a vertical plane and joined at the other end to an opposite adjacent link for pivotal movement in a horizontal plane. Each joint that pivots in a horizontal plane is supported by a roller traveling between the pair of horizontal guides, while each joint that pivots in a vertical plane is supported by a pair of rollers traveling on the pair of vertical support rails. A top plate is supported by each two pair of rollers on the vertical support rails forming cars for carrying loads and the manner of support does not impart bending stress to the links of the conveyor chain.

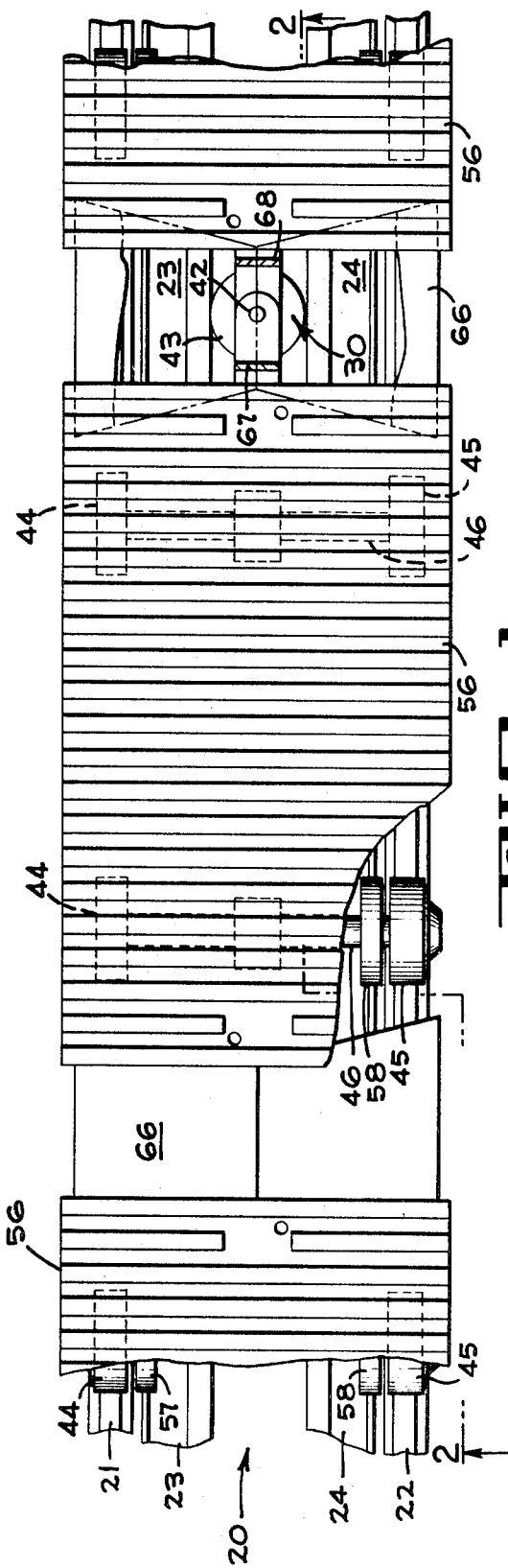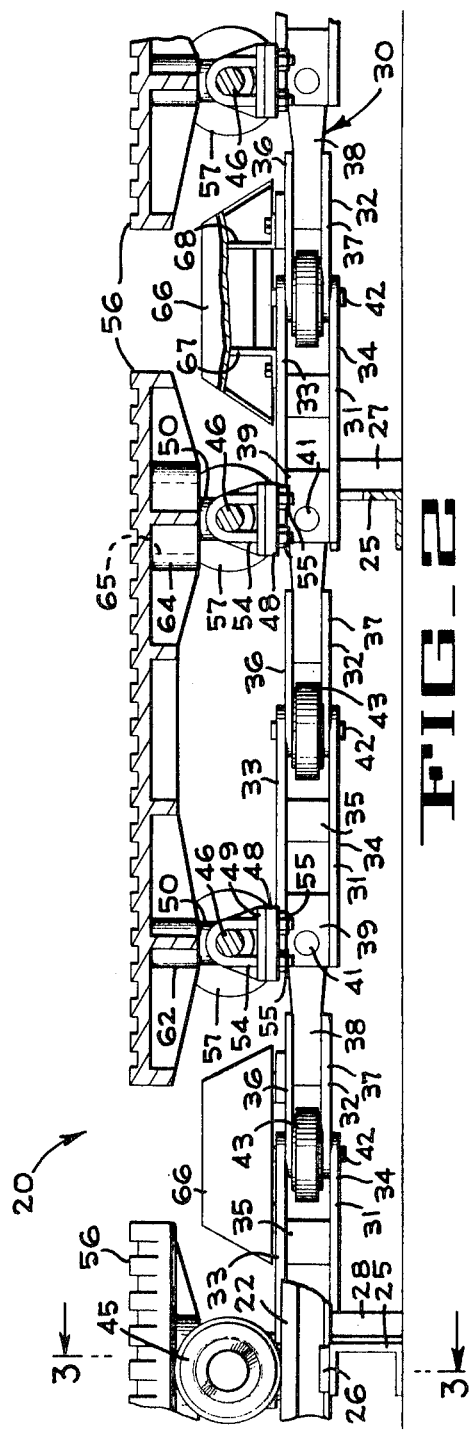

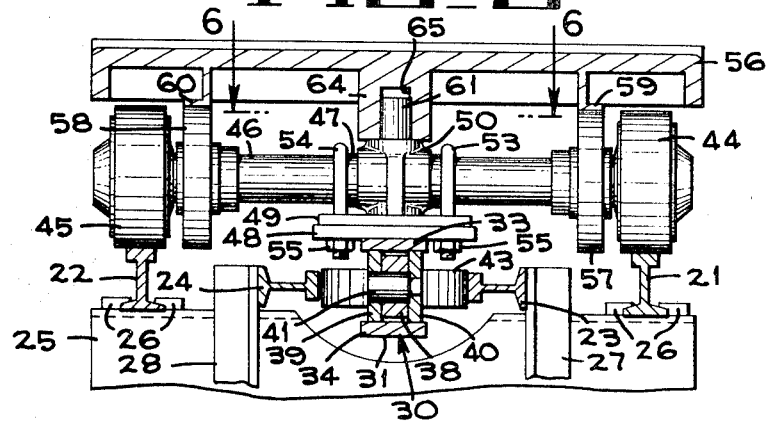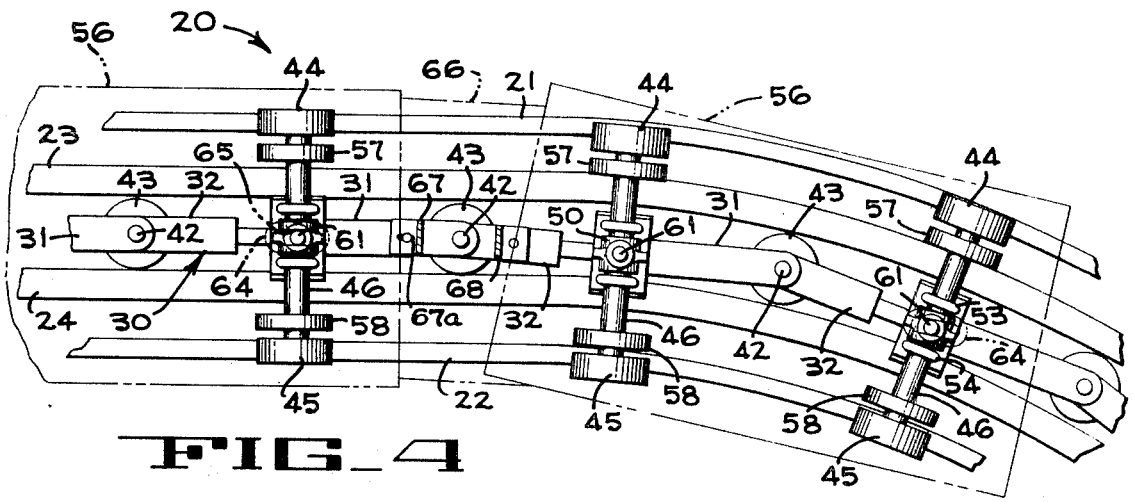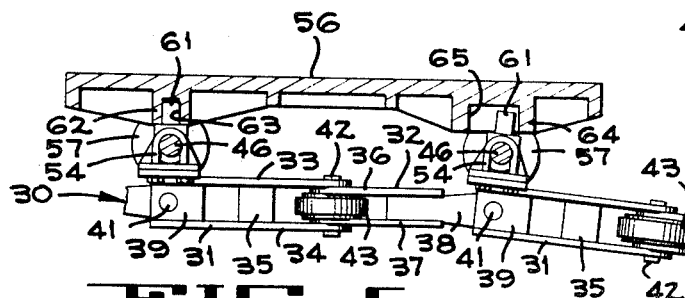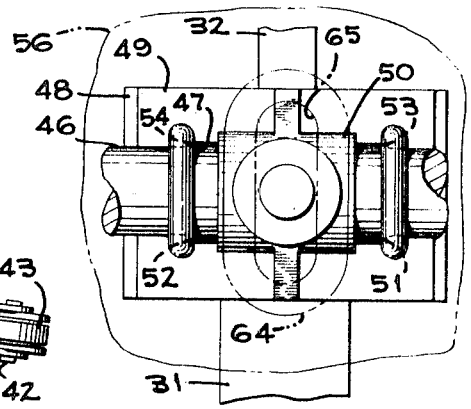

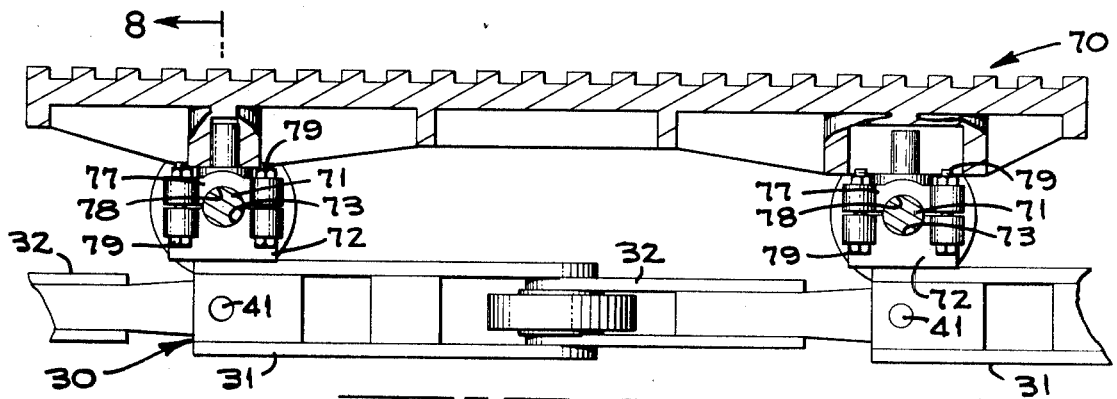
FIG_7
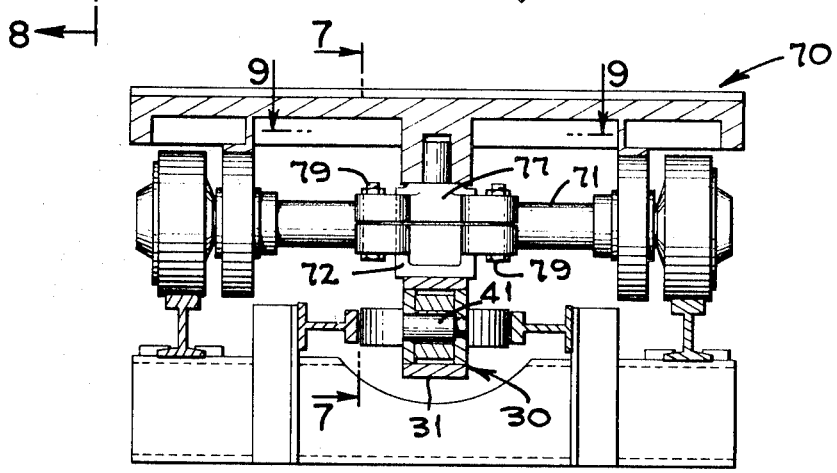
FIG_8
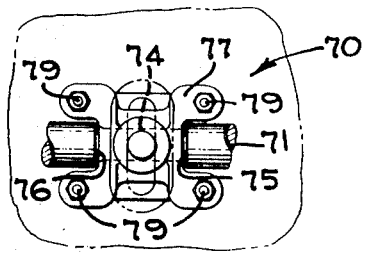
FIG_9

3,590,745

CAR-TYPE CONVEYOR CHAIN

BACKGROUND OF THE INVENTION

1. Field of the Invention

This invention relates to conveyors and more particularly to a car-type conveyor chain adapted for travel along a track that follows horizontal and vertical curves.

2. Description of the Prior Art

Car-type conveyor chains have been formed by a series of elongated links joined in end to end relationship. One end of each link was connected to an adjacent link for pivotal movement in a horizontal plane and the other end of each link was connected to an opposite adjacent link for pivotal movement in a vertical plane. The joint pivotable in a horizontal plane was supported by a horizontal roller that travels between a pair of spaced horizontal guides and the link was supported vertically at a point intermediately of the end joints. Thus, when the conveyor chain traversed a vertical curve, tension at link joints pivotable in a vertical plane would impart a bending stress to that portion of a link between the joint and the intermediate point of vertical support.

SUMMARY OF THE INVENTION

External bending forces on the chain links are eliminated by supporting each joint pivotable in a vertical plane directly under a pair of rollers that travel along the vertical support rails. Thus, vertical force components at these joints are resisted by the supporting rollers without imparting bending stress to the links.

A top plate for carrying loads is mounted above the conveyor chain in a manner that does not interfere with pivotal movement of the links as the chain traverses horizontal and vertical curves. The chain is economical to manufacture, simple to assemble and reliable in operation.

BRIEF DESCRIPTION OF THE DRAWING

FIG. 1 is a partial plan view of a car-type conveyor having portions broken away to show underlying structure.

FIG. 2 is a section taken on the line 2-2 of FIG. 1.

FIG. 3 is a section taken on the line 3-3 of FIG. 2.

FIG. 4 is a plan view of a section of roller chain along a horizontal curve.

FIG. 5 is a longitudinal central section of a roller chain on a vertical curve.

FIG. 6 is a section taken on the line 6-6 of FIG. 3.

FIG. 7 is a longitudinal section taken on the line 7-7 of FIG. 8 and illustrating a second embodiment of car-type conveyor.

FIG. 8 is a section taken on the line 8-8 of FIG. 7.

FIG. 9 is a section taken on the line 9-9 of FIG. 8.

DESCRIPTION OF THE PREFERRED EMBODIMENTS

Figure 10:
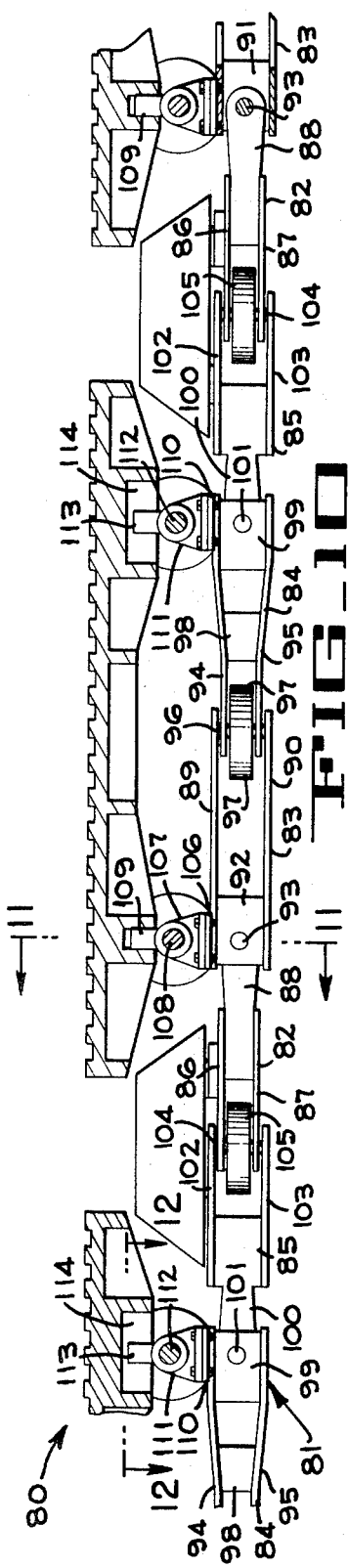
FIG. 10 is a longitudinal central section of a third embodiment of car type conveyor.

Looking now at FIG. 1, a portion of a car-type conveyor 20 is shown having a longitudinal track defined by a pair of spaced vertical support rails 21 and 22 and a pair of spaced horizontal guides 23 and 24. The vertical support rails are fastened to transverse beams 25, as shown in FIG. 3, by clips 26. Horizontal guide 23 is supported by an angle bar 27 and horizontal guide 24 is supported by an angle bar 28, both angle bars being fixed to the transverse beam. These transverse beams are spaced longitudinally at intervals along the track, as indicated in FIG. 2. The track can be aligned to follow horizontal and vertical curves and its function is to support and guide a roller chain 30 that travels therealong.

Roller chain 30 is formed by a series of elongated links 31 and 32, arranged alternately and joined in end to end relationship. Link 31 includes an upper side bar 33 and a lower side bar 34 that are held parallel in spaced relationship by a central vertical stiffener 35. Link 32 includes an upper side bar 36 and a lower side bar 37 that are held parallel in spaced relationship by a member 38 which serves as a stiffener between side bars and projects outward therefrom in tonguelike fashion.

A joint adapted for pivotal link movement in a vertical plane is formed at one end of link 31 by a pair of coupling stiffeners 39 and 40 that extend vertically in spaced relationship between upper side bar 33 and lower side bar 34, as shown in FIG. 3. The tonguelike member 38 of a link 32 fits between the coupling stiffeners and is locked in place by a horizontal pin 41 that extends transversely thereof. At the opposite end of link 31, as shown in FIG. 2, is a joint adapted for pivotal link movement in a horizontal plane. The upper side bar 36 and lower side bar 37 of a link 32 fit between upper side bar 33 and lower side bar 34 of a link 31. These side bars are drilled vertically to receive a pin 42 and a horizontal roller 43 is mounted on the pin between side bars 36 and 37. This roller fits between the horizontal guides 23 and 24, as shown in FIG. 4, to guide the roller chain 30 horizontally along the track.

Vertical support is provided for each joint of roller chain 30 where the links are adapted to pivot in a vertical plane. A pair of rollers 44 and 45, shown in FIG. 3, are provided at each such joint to roll along the vertical support rails 21 and 22, respectively. These rollers are rotatably mounted on each end of an axle 46 that extends therebetween and the roller chain joint is supported directly under a midportion 47 of the axle. A base plate 48 is fixed, in a manner such as by welding, to the top surface of the upper side bar 33 at a location directly above the horizontal pin 41. An anchor plate 49 fits on top of the base plate and a bolster sleeve 50 is welded to the top of the anchor plate. The bolster sleeve has a bore that receives the midportion 47 of the axle. This axle midportion has a diameter (FIG. 6) larger than the outer end portions thereof forming shoulders 51 and 52 at the points of transition between axle portions. The bolster sleeve is centered on the axle midportion by inverted U-bolts 53 and 54 that fit about the axle in abutment with the shoulders 51 and 52, respectively. The lower ends of U-bolts 53 and 54 extend through holes in the anchor plate and base plate and nuts 55 are threadably fitted thereon, locking the base plate to the anchor plate and tightening the U-bolts about axle 46.

A top plate 56 is supported by each pair of adjacent axles 46 along roller chain 30, as shown in FIG. 2. Positioned inboard on each axle from rollers 44 and 45, as shown in FIG. 3, are a pair of support rollers 57 and 58 that can turn upon the axle. A support beam 59 depends from the top plate and rests upon support roller 57 and a similar support beam 60 depends from the top plate and rests upon support roller 58. A bolster pin 61 projects upward from the bolster sleeve 50 and is aligned perpendicular to upper side bar 33 of link 31. A boss 62 projects downward at one end of the top plate, as shown in FIG. 5, and has a cylindrical hole 63 therein to receive the bolster pin 61. At the opposite end of the top plate, a boss 64 projects downward therefrom and has a slot 65 to receive the bolster pin 61. The support rollers 57 and 58 can roll along the support beams and thus, the axles 46 can pivot about the bolster pins 61 to move beneath the top plate.

As shown in FIG. 4, the axles 46 are aligned substantially on radial lines as the roller chain 30 moves along a horizontal curve. Each axle is perpendicular to a chord formed by adjacent links 32 and 31 and these chords are connected for pivotal movement in a horizontal plane by vertical pins 42. As the angularity between chords is increased, the horizontal spacing between bolster pins 61 on adjacent axles is decreased. Thus, a bolster pin in slot 65 can move horizontally within the slot to compensate for the change in horizontal spacing. When the roller chain traverses a vertical curve, as illustrated in FIG. 5, the bolster pin 61 within the slot 65 can pivot in a vertical plane and move horizontally within the slot to compensate for vertical angularity.

Spill plates 66, shown in FIG. 1, are located between each top plate 56 to prevent spillage of molten material from contacting the roller chain 30. A leg 67 depends from the center of each spill plate and is bolted to an upper side bar 33, while a leg 68 depends from the center of each spill plate and is bolted to an upper side bar 36. Leg 67 is slotted as shown at 67a (FIG. 4) to allow for pivotal movement of roller 43. The spill plates slope downward from the center towards opposite sides of the roller chain.

Car-type conveyor 20 is driven by means of a booster drive, not shown. This drive includes a short pitch roller chain that operates over relatively small diameter sprocket wheels. The chain is fitted with roller-equipped dogs operating on tracks so designed as to engage and disengage the roller chain 30 without shock and with at least one dog always pushing on the roller chain.

A second embodiment of car-type conveyor 70 is illustrated in FIGS. 7, 8 and 9. Links 31 and 32 are the same as links having the same number and described with reference to roller chain 30. The modification herein involves the manner in which links 31 are connected with axles 71 providing vertical support for joints pivotable in a vertical plane.

A bolster base 72 is welded to link 31 and has a semicircular groove 73 extending transversely along its upper surface, parallel with and directly above horizontal pin 41. Axle 71 has a midportion 74, as shown in FIG. 9, that has a diameter smaller than the outer end portions thereof forming shoulders 75 and 76 at the points of transition between axle portions. The lower half of the axle midportion fits within the semicircular groove 73 of the bolster base 72, thereby centering the axle in the bolster base. A bolster cap 77 has a semicircular groove 78 extending along its lower surface to fit about the upper half of the axle midportion. The bolster cap is connected with the bolster base by four bolts 79 that extend through holes in the base and cap. Thus, the axle is firmly held in position between the bolster base and cap and horizontal shear at the joint therebetween is resisted by the axle and the four bolts. The remaining structure is similar to that previously described with reference to car-type conveyor 20.

Figure 12:
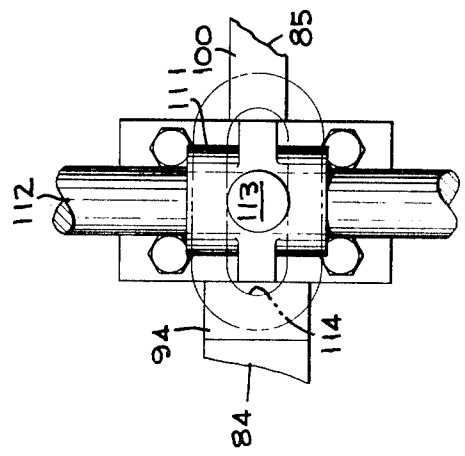
FIG. 12 is a section taken on the line 12-12 of FIG. 10
Figure 11:
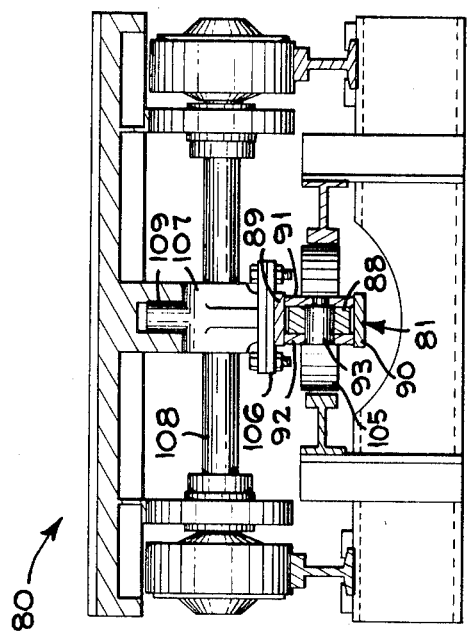
FIG. 11 is a section taken on the line 11-11 of FIG. 10.

A third embodiment of car-type conveyor 80 is shown in FIGS. 10, 11 and 12. Variations herein from the previously described structure of car-type conveyor 20 involve the arrangement of links in the roller chains and the positioning of bolsters thereon.

Roller chain 81, shown in FIG. 10, is formed with four types of links 82, 83, 84 and 85 joined together in end to end relationship and arranged progressively in a repeating series. Link 82 includes an upper side bar 86 and a lower side bar 87 that are held parallel in spaced relationship by a member 88 which acts as a vertical stiffener and projects beyond the side bars to where it is joined to link 83. Link 83 includes an upper side bar 89 and a lower side bar 90 that are held parallel in spaced relationship by a pair of coupling stiffeners 91 and 92 (FIG. 11). Member 88 of link 82 fits between the coupling stiffeners 91 and 92 and is locked in place by a horizontal pin 93 that extends transversely thereof. Links 82 and 83 are pivotable in a vertical plane about the horizontal pin 93.

Link 84 includes an upper side bar 94 and a lower side bar 95 that fit between the upper side bar 89 and lower side bar 90 of link 83 and a vertical pin 96 passes through holes in the side bars, joining links 83 and 84 for pivotal movement in a horizontal plane. A horizontal roller 97 is mounted on vertical pin 96 to provide horizontal support for the joint. Upper side bar 94 and lower side bar 95 diverge along the midportion of link 84 and are supported in spaced relationship therealong by a vertical stiffener 98. This stiffener also restrains the side bars from tending to straighten out when great tension stress is applied to link 84. At the opposite end of link 84 from vertical pin 96, the side bars are parallel with each other and spaced by a distance equal to the spacing between side bars of link 83. A coupling stiffener 99 and a similar stiffener, not shown, extend vertically between side bars 94 and 95 and are spaced apart to receive a member 100 of link 85 therebetween. A horizontal pin 101 extends through the stiffeners locking link 84 to link 85.

Link 85 has an upper side bar 102 and a lower side bar 103 that are held in spaced relationship by member 100. At the opposite end of link 85, a pin 104 extends vertically through the side bars of that link and a link 82 forming a joint about which the links can pivot in a horizontal plane. A horizontal roller 105 is mounted on the pin to provide support for the joint.

A mounting plate 106 is welded to the top of upper side bar 89 and a bolster 107 is bolted to the mounting plate to align an axle 108 about which the bolster fits, in a position directly above horizontal pin 93. A bolster pin 109 projects upward from the bolster perpendicular to link 83. Similarly, a mounting plate 110 is welded to the top of upper side bar 94 and a bolster 111 is bolted thereto. Axle 112 is aligned within the bolster 111 directly above horizontal pin 101 and a bolster pin 113 projects upward from the bolster perpendicular to link 84. Since links 83 and 84 can only pivot relative to each other in a horizontal plane, bolster pins 109 and 113 are maintained parallel with each other and perpendicular to the links. Thus, bolster pin 113 moves only in a horizontal line axially of a slot 114, as indicated in FIGS. 10 and 12.

Since the conveyor track, rollers, top plates and spill plates are of similar construction to the structure described for car-type conveyor 20, no further description of this structure is considered necessary to describe car-type conveyor 80.

Although the best mode contemplated for carrying out the present invention has been herein shown and described, it will be apparent that modification and variation may be made without departing from what is regarded to be the subject matter of the invention.

What we claim is:

1. In a car-type conveyor having a series of roller-supported cars that travel along a track defined by a pair of vertical support rails and a pair of horizontal guides positioned along horizontal and vertical curves; a roller chain comprising a series of elongated links joined in end to end relationship there being two different kinds of links every other link being identical; one end of each link being connected to an adjacent link for pivotal movement in a horizontal plane, the other end of each link being connected to an opposite adjacent link for pivotal movement in a vertical plane; a horizontal roller located at each joint pivotable in a horizontal plane for supporting the joint within the horizontal plane intermediately of the horizontal guides; a pair of rollers adapted for rotation in vertical planes on each vertical support rail above each joint pivotable in a vertical plane, an axle extending between each pair of rollers on the vertical support rails, and a bolster mounted on each axle for supporting directly thereunder a respective joint pivotable in a vertical plane, whereby said roller chain can be drawn along the track following horizontal and vertical curves without imparting external bending stresses upon the elongated links.

2. A roller chain as described in claim 1 wherein each elongated link thereof includes a pair of straight longitudinal side bars supported in parallel relationship by transverse stiffeners extending therebetween.

3. A roller chain as described in claim 1 wherein each bolster includes a base grooved along its upper surface to fit about the lower half of the axle extending between rollers on the vertical support rails, a cap grooved along its lower surface to fit about the upper half of the axle, and bolts fastening the base to the cap whereby horizontal shear at the joint between base and cap is resisted by the bolts and axle.

4. A roller chain as described in claim 1 wherein said axle has a midportion stepped in diameter from outer end portions thereof and said bolster is centered on the axle by engagement with the stepped midportion.

5. A roller chain as described in claim 1 including a pin projecting upward from each bolster, and a top plate mountable on each pair of pins, said top plate having a hole therein for receiving one pin and a longitudinal slot for receiving the other pin, whereby said bolsters are pivotable beneath the top plate to enable the axles to follow radial lines about a horizontal curve and variations in horizontal spacing between axles is compensated for by sliding movement of the pin within the longitudinal slot.

6. A roller chain as described in claim 5 including a pair of rollers spaced inboard on said axle from the rollers that rotate on the vertical support rails, said inboard rollers supporting the top plate above the axle to enable pivotal movement of the axle thereunder.

7. A roller chain as described in claim 6 wherein the bolster having a pin fitting within a hole in the top plate is connected to one end of a link having an opposite end connected for pivotal movement in a horizontal plane to the other link under the top plate and the bolster having a pin fitting within a slot in the top plate is connected to one end of a link having an opposite end connected for pivotal movement in a horizontal plane to a link that is not beneath the top plate whereby the pin fitting within the slot slides in a horizontal plane and pivots in a vertical plane within the slot.

8. In a car-type conveyor having a series of roller-supported cars that travel along a track defined by a pair of vertical support rails and a pair of horizontal guides positioned along horizontal and vertical curves; a roller chain comprising a series of elongated links joined in end to end relationship; one end of each link being connected to an adjacent link for pivotal movement in a horizontal plane, the other end of each link being connected to an opposite adjacent link for pivotal movement in a vertical plane; a horizontal roller located at each joint pivotable in a horizontal plane for supporting the joint within the horizontal plane intermediately of the horizontal guides; a pair of rollers adapted for rotation in vertical planes on each vertical support rail above each joint pivotable in a vertical plane, an axle extending between each pair of rollers on the vertical support rails, said axle having a midportion of a larger diameter than the outer end portions to define shoulders at the points of transition, and a bolster clamped on each axle for supporting directly thereunder a respective joint pivotable in a vertical plane, said bolster being clamped to the axle by a pair of U-shaped bolts fitting around the outer end portions and in abutment with the shoulders to center the bolster on the midportion of the axle, whereby said roller chain can be drawn along the track following horizontal and vertical curves without imparting external bending stresses upon the elongated links.

9. In a car-type conveyor chain having a series of roller-supported cars that travel along a path defined by a pair of horizontal guides positioned along horizontal and vertical curves, a roller chain comprising: a series of two pairs of elongated inner and outer links joined together in end to end relationship, 1. a first inner link having one end being connected to an adjacent first outer link for pivotal movement in a vertical plane,
2. the other end of the first outer link being connected to one end of an adjacent second inner link for pivotal movement in a horizontal plane,
3. the other end of the second inner link being connected to one end of an adjacent second outer link for pivotal movement in a vertical plane, and
4. the other end of the second outer link being connected to the other end of the first inner link for pivotal movement in a horizontal plane.

10. The conveyor of claim 9 further including a horizontal roller located at each joint pivotable in a horizontal plane for supporting the joint within the horizontal plane intermediately of the horizontal guides.

11. The conveyor of claim 10 further including a pair of rollers adapted for rotation in vertical planes on each vertical support rail and an axle above each joint pivotable in a vertical plane extending between each pair of rollers on the vertical support rails.

12. The conveyor of claim 11 further including a first mounting plate attached to said first outer link and a second mounting plate attached to said second inner link, each plate located directly above a respective joint pivotable in a vertical plane, and a bolster mounted on each axle and connected to each mounting plate having a bolster pin projecting upwards perpendicular to the mounting plates, whereby said roller chain can be drawn along the track following horizontal and vertical curves without imparting external bending stresses upon the elongated links when articulating in either the horizontal or vertical planes and the two adjacent bolster pins remaining parallel in pairs as the chain articulates on vertical curves.